US008781236B2

(12) United States Patent
Barnsley

(10) Patent No.: US 8,781,236 B2
(45) Date of Patent: Jul. 15, 2014

(54) PROCESSING GRAPHICAL DATA REPRESENTING A SEQUENCE OF IMAGES FOR COMPRESSION

(75) Inventor: Jeremy D Barnsley, Newcastle Upon Tyne (GB)

(73) Assignee: BRITISH TELECOMMUNICATIONS public limited company, London (GB)

(*) Notice: Subject to any disclaimer, the term of this patent is extended or adjusted under 35 U.S.C. 154(b) by 324 days.

(21) Appl. No.: 13/141,866

(22) PCT Filed: Nov. 20, 2009

(86) PCT No.: PCT/GB2009/002723
§ 371 (c)(1),
(2), (4) Date: Jun. 23, 2011

(87) PCT Pub. No.: WO2010/072989
PCT Pub. Date: Jul. 1, 2010

(65) Prior Publication Data
US 2011/0262048 A1 Oct. 27, 2011

(30) Foreign Application Priority Data

Dec. 23, 2008 (GB) .................................. 0823481.7

(51) Int. Cl.
G06K 9/36 (2006.01)
G06K 9/46 (2006.01)

(52) U.S. Cl.
USPC .......................................... 382/233; 382/236

(58) Field of Classification Search
CPC ................... H04N 7/26111; H04N 1/40093
USPC ................ 382/162, 167, 274, 232, 233, 236;
375/240.01; 348/390.1
See application file for complete search history.

(56) References Cited

U.S. PATENT DOCUMENTS 4,326,258 A * 4/1982 de la Guardia ............... 382/137
5,808,682 A * 9/1998 Okunoki et al. ......... 375/240.01
(Continued)

FOREIGN PATENT DOCUMENTS

EP 1 229 495 A2 8/2002

OTHER PUBLICATIONS

International Search Report for PCT/GB2009/002723, dated May 7, 2010.

(Continued)

Primary Examiner — Yubin Hung
(74) Attorney, Agent, or Firm — Nixon & Vanderhye P.C.

(57) ABSTRACT

A method for processing graphical data representing a sequence of images prior to compression, including analyzing a plurality of adjacent areas of an image from the sequence to determine: (i) a first set of areas, each of which includes changes when compared with a corresponding area in a previous image from the sequence; and (ii) a second set of areas, each of which does not include a change when compared with a corresponding area in the previous image. For each area of the second set, a section of the area is replaced with a block chosen to reduce the size of the graphical data once compressed, while leaving the original image of the area of the second set adjacent any part of the perimeter that adjoins an area of the first set. A dataset is provided to allow identification of the areas of the second set. On decompression of the compressed graphical data, the dataset is accessed and the image is processed by replacing each area of the second set with the corresponding area from a previous image. A system for processing the graphical data according to the steps set out above is also provided.

10 Claims, 4 Drawing Sheets

(56) References Cited

U.S. PATENT DOCUMENTS

| | | | |
|---|---|---|---|
| 5,854,857 A | | 12/1998 | De Queiroz et al. |
| 6,333,949 B1 | | 12/2001 | Nakagawa et al. |
| 2002/0061063 A1 | * | 5/2002 | Otto .................. 375/240.03 |
| 2005/0163346 A1 | * | 7/2005 | van den Bergen et al. ... 382/103 |
| 2006/0013495 A1 | * | 1/2006 | Duan et al. .................. 382/235 |
| 2006/0193509 A1 | * | 8/2006 | Criminisi et al. ............. 382/154 |
| 2008/0100870 A1 | * | 5/2008 | Fujii et al. ...................... 358/3.2 |
| 2008/0115073 A1 | | 5/2008 | Erickson et al. |

OTHER PUBLICATIONS

Search Report (3 pgs.) dated Apr. 8, 2009 issued in priority GB Application No. GB0823481.7.

Zeng et al.; "Robust moving object segmentation on H.264/AVC compressed video using the block based MRF model"; Real-Time Imaging, Aug. 2005, Academic Press UK, vol. 11, Nr. 4, pp. 290-299, ISSN 1077-2014.

Written Opinion of the International Searching Authority (6 pgs.) issued in International Application No. PCT/GB2009/002723, (2009).

Joo-Hee Moon et al.; "Boundary Block-Merging (BBM) Technique for Efficient Texture Coding of Arbitrarily Shaped Object"; IEEE Transactions on Circuits and Systems for Video Technology, IEEE Service Center, Piscataway, NJ, US, vol. 9, No. 1, Feb. 1, 1999, XP011014542.

* cited by examiner

PROCESSING GRAPHICAL DATA REPRESENTING A SEQUENCE OF IMAGES FOR COMPRESSION

This application is the U.S. national phase of International Application No. PCT/GB2009/002723 filed 20 Nov. 2009 which designated the U.S. and claims priority to GB Patent Application No. 0823481.7 filed 23 Dec. 2008, the entire contents of each of which are hereby incorporated by reference.

TECHNICAL FIELD

This invention relates to a method and system for processing graphical data.

BACKGROUND

With the ever increasing volumes of image data and with ever increasing demand for higher-resolution images, there is a continuing need for reducing further the size of compressed image data. JPEG2000 compression/decompression is a significant improvement over standard JPEG compression/decompression. It can yield equivalent image quality but with much smaller compressed file size. JPEG2000 compression/decompression is capable of supporting both lossless and lossy compression. Lossless compression allows the exact original data to be reconstructed from the compressed data but at the expense of lower efficiency. Lossy compression is more efficient, producing smaller compressed image files but cannot guarantee to reproduce exactly the same image data.

A reduction in the size of image data may be achieved where the image is split into a series of areas, referred to as "tiles", and where only those tiles in which the image has changed are sent. According to this scheme, when only a small, localised part of the whole image of, say, 16 tiles has changed, it may be that only three of the 16 tiles need to be provided. These three tiles can then be overlaid on the previous image in order to generate the full image. However, this technique will only work well with JPEG2000 if lossless compression is used. If lossy compression is used, tile boundary artefacts appear at the boundaries between the changed tiles and the tiles imported from the previous image. These artefacts display a noticeable tile boundary and can result in a reduction in perceived image quality. The tile boundaries become more noticeable the higher the rate of compression.

It is therefore desirable to provide a method and system for processing image data so as to reduce the size of compressed image data without introducing tile boundary artefacts at high compression rates.

SUMMARY OF THE INVENTION

There is provided a way of processing an image regarded as comprising a number of areas, in which, prior to compression, each area that has not changed since the previous image, is processed by blanking out most, but not all, of the area. In particular, at least some of the original image content near to the boundaries of the area is not blanked so as to eliminate tile boundary artefacts when the image is reconstituted.

According to a first aspect, there is provided a method for processing graphical data representing a sequence of images prior to compression, including analysing a plurality of adjacent areas of an image from the sequence to determine: (i) a first set of areas, each of which includes changes when compared with a corresponding area in a previous image from the sequence; and (ii) a second set of areas, each of which does not include a change when compared with a corresponding area in the previous image. For each area of the second set, a section of the area is replaced with a block chosen to reduce the size of the graphical data once compressed, while leaving the original image of the area of the second set adjacent any part of the perimeter that adjoins an area of the first set. A dataset is provided to allow identification of the areas of the second set. The processed graphical data is then ready to be compressed for efficient transmission or storage.

According to a further aspect, there is provided a system for processing graphical data representing a sequence of images prior to compression of that data, in which the system comprises an analyser for analysing a plurality of adjacent areas of an image from a sequence to determine: a first set of areas and a second set of areas, as set out above. The system further comprises a processor for processing the image by replacing a section of each area of the second set with a block chosen to reduce the size of the graphical data once compressed, while leaving the original image adjacent any part of a perimeter of each area of the second set which adjoins an area of the first set. The processor further provides a dataset allowing identification of the areas of the second set.

According to a further aspect, there is provided a method for processing the compressed graphical data representing a sequence of images, in which the compressed graphical data is decompressed (for example following transmission or storage) and the dataset is accessed and the image is processed by replacing each area of the second set with the corresponding area from a previous image.

According to a further aspect, there is provided a system for processing the compressed graphical data representing a sequence of images, comprising a processor for processing the compressed graphical data by decompressing the data (for example following transmission or storage), accessing the dataset and replacing each area of the second set with the corresponding area from a previous image.

The invention will now be described, by way of example, with reference to the accompanying drawings in which.

SPECIFIC DESCRIPTION

Figure 1:
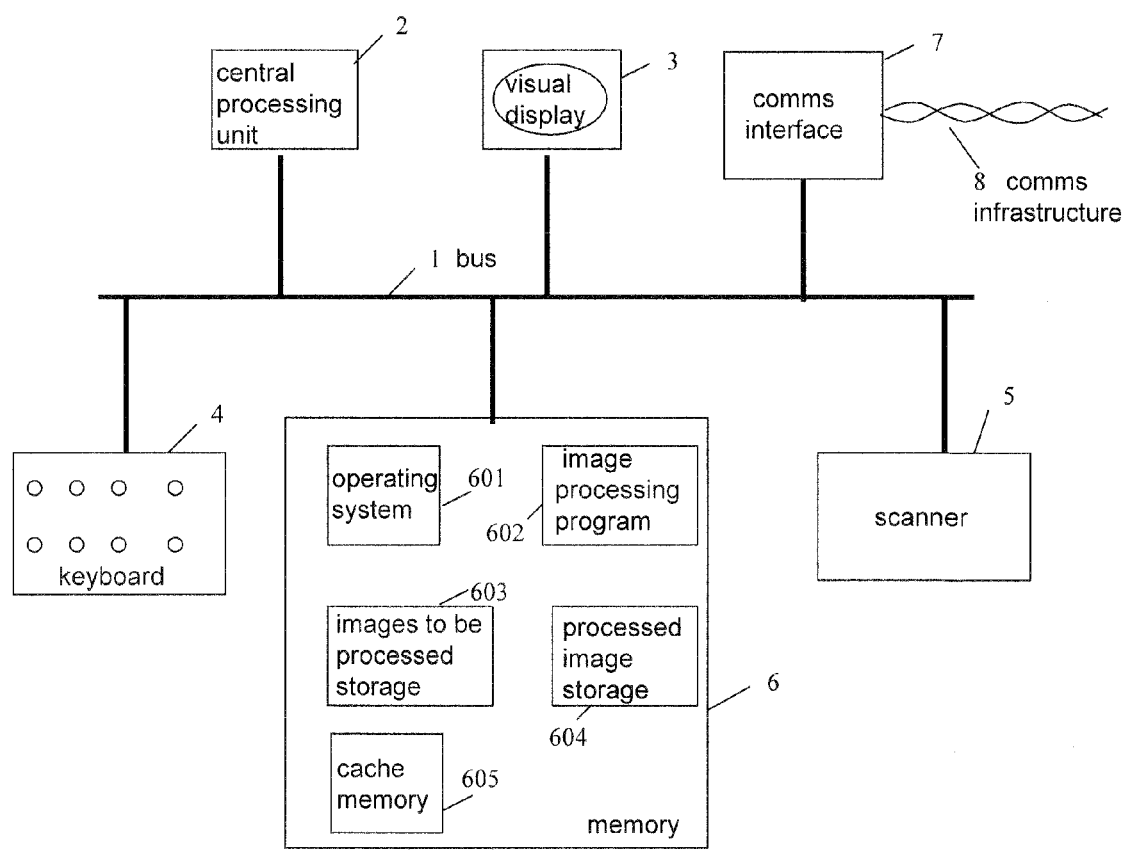
FIG. 1 is a block diagram of an apparatus for performing the invention.

FIG. 1 shows an apparatus such as a workstation or server consisting of a general purpose computer programmed to perform image processing according to a first embodiment of the invention. The workstation or server has a bus 1, to which are connected a central processing unit 2, a visual display 3, a keyboard 4, a scanner 5 (or other input device, not shown) for input of images, and a memory 6.

In the memory 6 are stored an operating system 601, a program 602 for performing the image processing (including the method of the present invention and image compression), and storage areas 603, 604 for storing images to be processed and processed images, respectively. Memory 6 also comprises a cache memory 605 for storing a copy of at least one previous image to allow for a comparison between successive images in a sequence to be performed by image processing program 602. Each image is stored as a two-dimensional array of values, each value representing the brightness and/or colour of a picture element within the array. Storage areas 603, 604 will be characterised by a limit on the capacity available for storing image data.

Also connected via bus 1 is communications interface 7 which is able to send to and receive from remote apparatus (not shown) image data and other messages. The remote apparatus can include servers and workstations similar to that shown in FIG. 1. Data is exchanged via communications infrastructure 8. Communications infrastructure 8 could comprise a point-to-point connection or a network of some form, for example the Internet, an in-house local area network, a metropolitan-area or wide-area network. In any of these cases communications infrastructure 8 will be characterised by a limit on the bandwidth available for transferring image data. Communications infrastructure 8 may be implemented using any suitable communications protocol, such as Internet Protocol, operating over any convenient electrical or electromagnetic medium. For simplicity, it will be assumed in the following description that the remote apparatus receiving compressed images via communications infrastructure 8 is identical in design to the sending apparatus shown in FIG. 1.

The invention will now be described in more detail with reference to the images of FIGS. 2 to 7.

Figure 2:
FIG. 2 shows an image suitable for compression in accordance with the present invention.

The image of FIG. 2 shows a photograph of a cable car. To the left of the cable car, part of a gantry supporting the cable is visible and below the cable car some vegetation can be seen, otherwise the image is mainly plain background.

Figure 3:
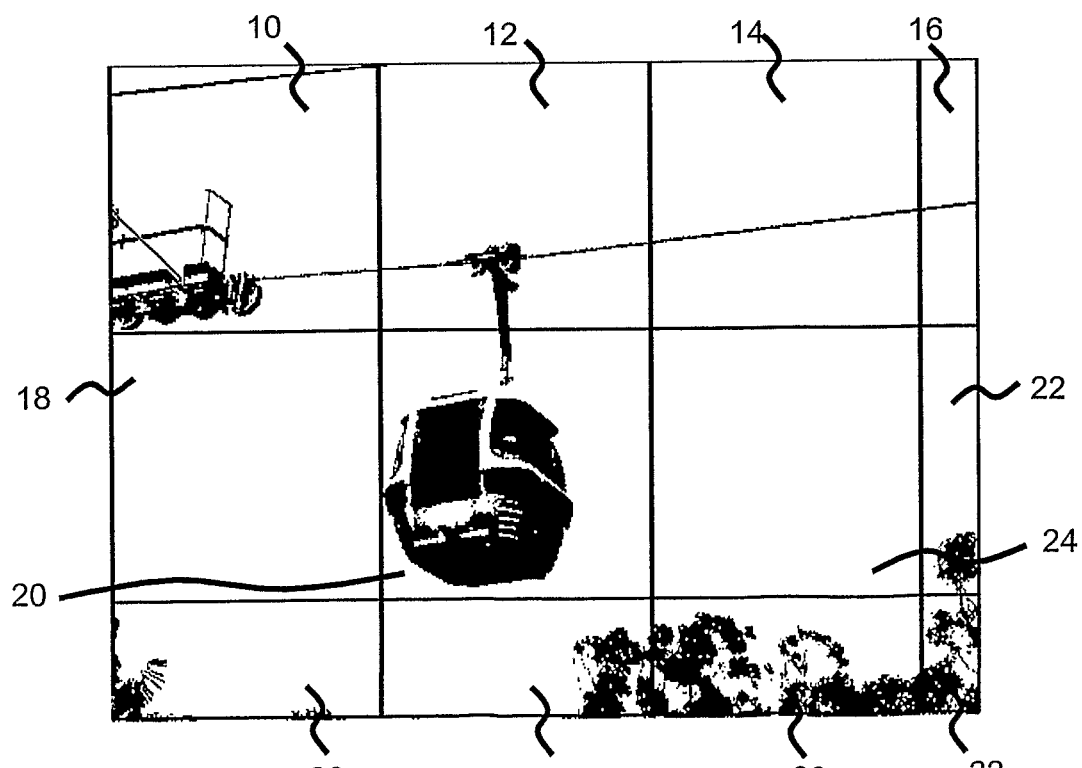
FIGS. 3-7 illustrate application of the invention to suitable images.

FIG. 3 shows the image of FIG. 2 divided into twelve areas, as a preliminary step in applying the invention. The actual number of areas used is not seen as critical and may be selected according to the amount of detail or the distribution of moving elements of the image in relation to stationary elements. However, varying the number of areas for an image will give different bandwidth gains depending on image content and the degree of change between successive images. It will be noted that some of the areas in FIG. 3 contain nothing but the plain background whereas other areas comprise parts of the cable car and yet further areas contain parts of the gantry and the vegetation.

For ease of reference, each area is allocated a reference number from 10-32. According to a preferred embodiment, the areas do not need to all be the same size. In FIG. 3, areas 10, 12, 14, 18, 20 and 22 are larger areas, whereas areas 16, 24, 26, 28, 30 and 32 are smaller areas with each smaller tile being limited by one or more edges of the image. According to an alternative embodiment, the size and shape of the areas may be selected so that each area is the same size.

Figure 4:
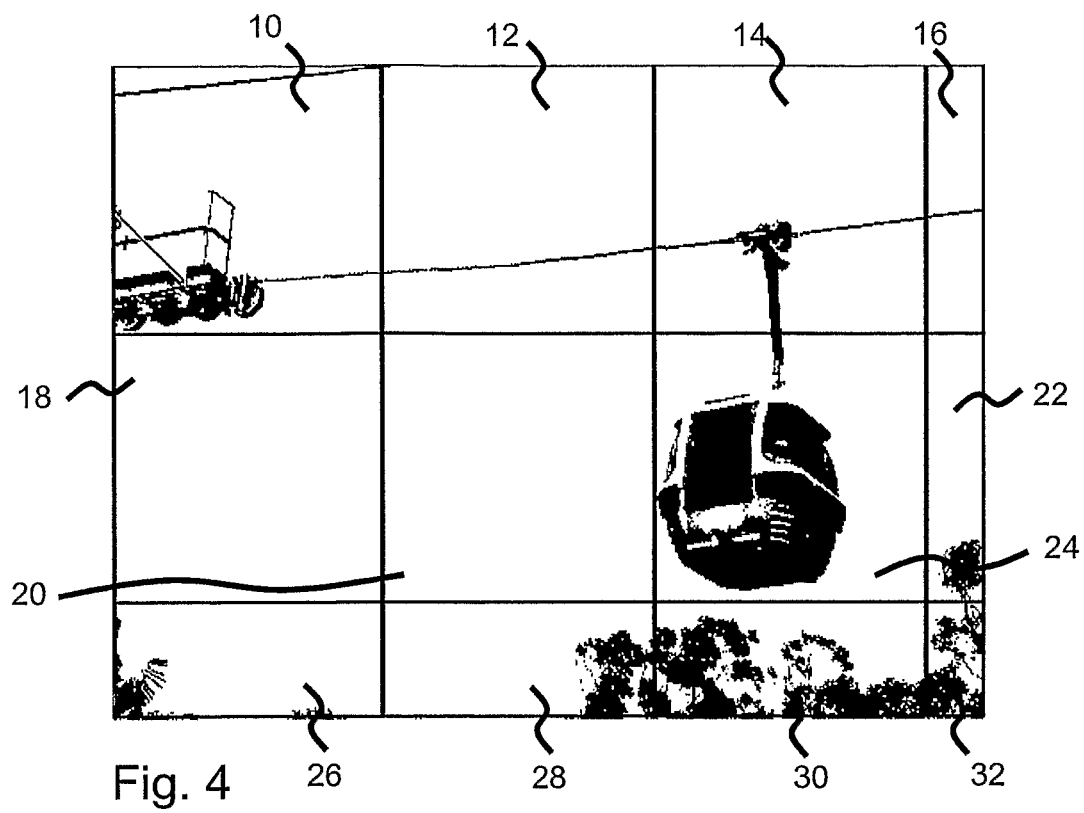

FIG. 4 shows a subsequent image forming part of a sequence with FIG. 3 in order to show movement of the cable car. The image of FIG. 4 is divided into areas in a similar way to the image of FIG. 3 and the same reference numerals will be used to denote corresponding areas in each figure. It will be noted that, in FIG. 4, the cable car has moved to the right whilst the gantry and vegetation appear stationary. It will be further noted that the images of areas 10 and 18 (showing part of the gantry and plain background) are identical in FIGS. 3 and 4, whereas the images of areas 12, 14, 20 and 22 in FIG. 4 are different from the corresponding areas in FIG. 3 (due to movement of the cable car). In addition, smaller areas 16, 24, 26, 28, 30 and 32 are identical in FIGS. 3 and 4.

Figure 5:
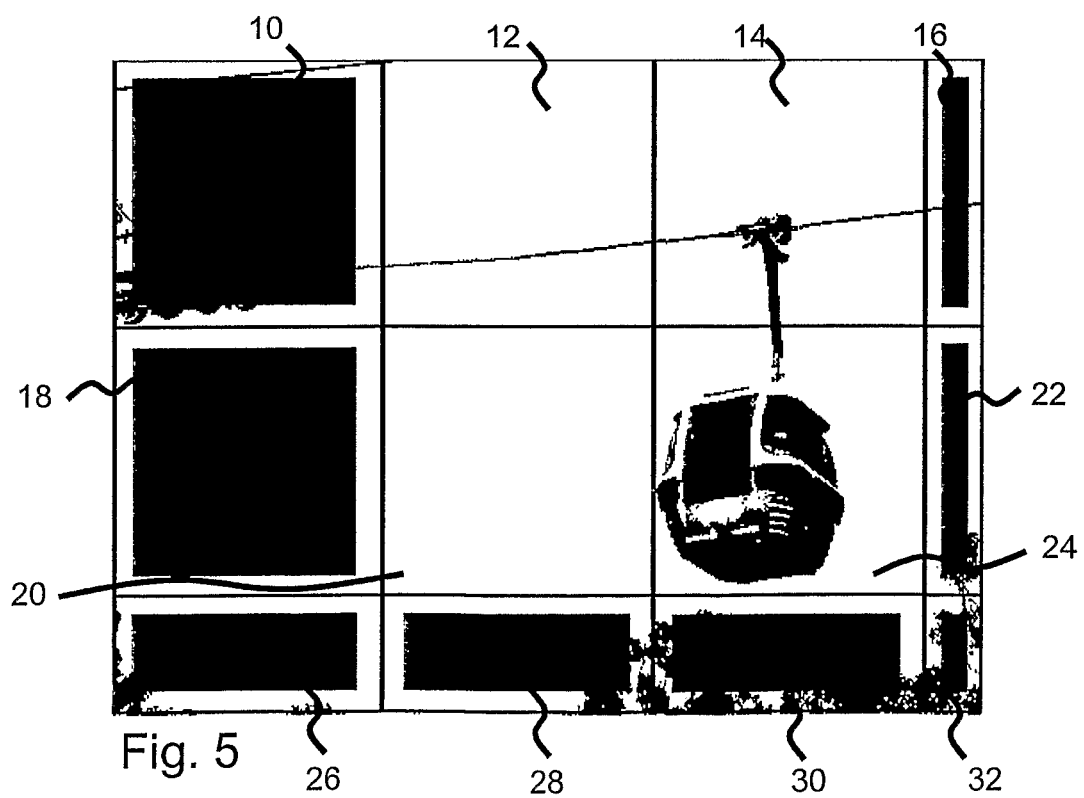

The blanking of areas according to an embodiment of the invention will now be described with reference to FIG. 5. FIG. 5 shows an example of area blanking for the image of FIG. 4, based on a comparison of each area in FIG. 4 with the corresponding area in FIG. 3. The image to be processed is read from input image store 603 under control of processor 2 running image processing program 602. FIG. 5, shows the processed image which is ready to be compressed under control of processor 2, for example according to an industry standard compression algorithm, such as JPEG2000, and transferred to output image store 604. Processor 2 also generates a dataset of control information indicating which unchanged areas of the image are to be overlaid on the decompressed image at the remote apparatus.

As will be seen from FIG. 5, changed areas 12, 14, 20 and 22 have no blanking in the processed image, whereas unchanged areas 10, 16, 18, 24, 26, 28, 30 and 32 have had a central portion blanked out (represented in the image as an area of solid black). The blanking of each of these unchanged areas is done so as to leave a portion of the original image still visible along each boundary of the area. This is done to avoid undesirable edge effects when replacing the blanked-out area with a corresponding area from the previous image (in this case an area from the image of FIG. 3 held in cache 605 at the remote apparatus).

The blanking of areas according to a further embodiment of the invention will now be described with reference to FIG. 6. According to this embodiment, operation of the workstation or server of FIG. 1 is similar to that described above with reference to FIG. 5 but the rules governing blanking are now different.

According to this embodiment, the blanking may, advantageously, be extended further. Wherever an area with blanking has an immediate neighbour area with blanking, the blanking may be extended between the two areas so as to generate a contiguous blanked area. Taking for example smaller-area 28, this has blanked neighbour areas 26 and 30. Since smaller areas 26, 28 and 30 are to be replaced at the destination following decompression from the cache of the previous frame, there is no issue with edge-effects at the boundaries between these areas as these areas can be replaced as a block with a corresponding block of areas from a single, earlier image. The same logic applies to all of areas 10, 16, 18, 24, 26, 28, 30 and 32 which may be replaced as a single block and in which blanking can be applied right up to the boundary with any adjacent areas belonging to the same block. Replacing these areas as a block will not generate any discontinuities at the boundaries between the constituent areas.

Figure 6:
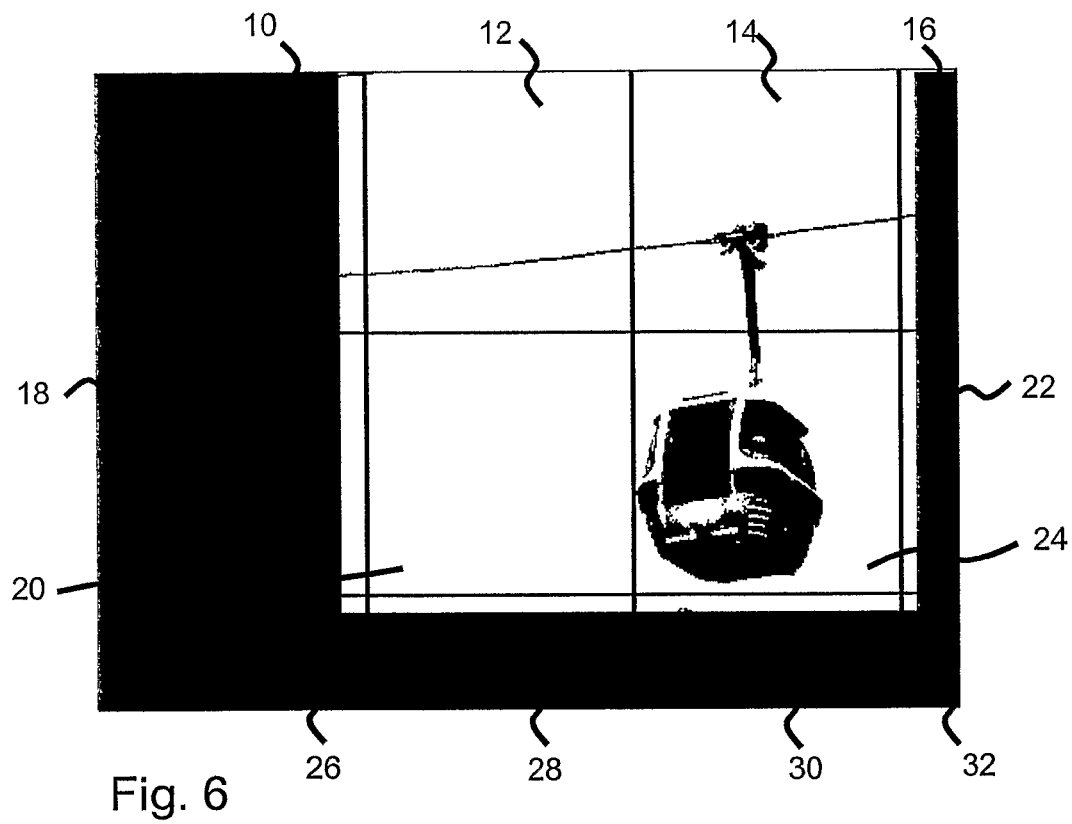

As will be seen from FIG. 6, changed areas 12, 14, 20 and 22 again have no blanking, whereas unchanged areas 10, 16, 18, 24, 26, 28, 30 and 32 are blanked-out but, according to different rules. As with the embodiment of FIG. 5, the blanked-out area of each of unchanged areas 10, 16, 18, 24, 26, 28, 30 and 32 leaves a portion of the original image still visible at the boundary with a neighbouring changed area. As before, this is done to avoid undesirable edge effects when replacing the blanked-out area with a corresponding area from the previous image (in this case an area from the image of FIG. 3). Unlike the embodiment of FIG. 5, the original image is not visible at a boundary between two neighbouring unchanged areas. Instead, the blanked-out area extends right up to such boundaries, thereby enhancing the reduction in image data size.

According to a further embodiment, also illustrated in FIG. 6, for each unchanged area that has a boundary which coincides with an edge of the image (in the example of FIG. 4, each of unchanged areas 10, 16, 18, 24, 26, 28, 30 and 32), the blanking is extended in the direction of the edge boundary. In both these ways, the blanked-out block is increased in size, resulting in a beneficial improvement in the degree of compression achievable for the image, while continuing to avoid undesirable edge effects.

Figure 7:
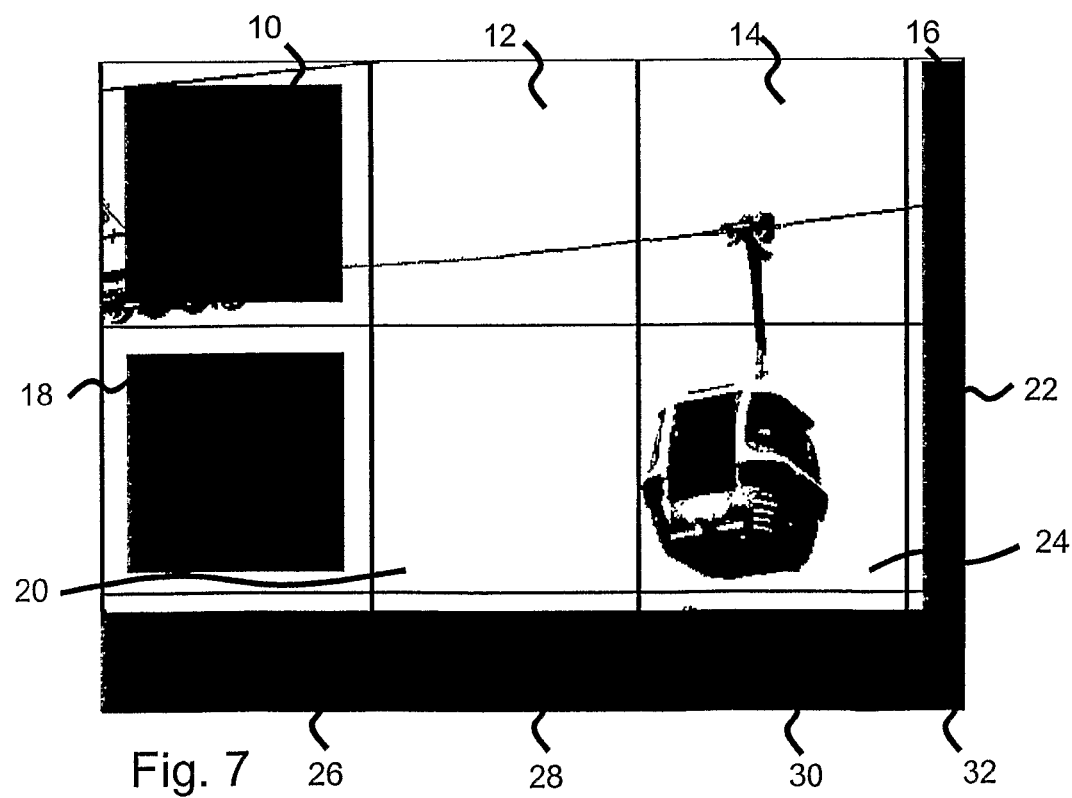

Finally, FIG. 7 shows an example of area blanking for the image of FIG. 4, based on a combination of the rules for image processing set out above in relation to FIGS. 5 and 6. As with previous embodiments, in FIG. 7 changed areas 12, 14, 20 and 22 have no blanking. Larger unchanged areas 10 and 18 have had a central portion blanked out. The blanking of areas 10 and 18 is done so as to leave a portion of the original image still visible along each boundary of the area. Smaller unchanged areas 16, 24, 26, 28, 30 and 32 are also blanked-out but, according to the embodiments of FIG. 6, with the blanking extended to boundaries with adjacent, unchanged areas and to boundaries coincident with an edge of the image.

The resulting image, containing blanking in accordance with any of the embodiments described above, is compressed as a single image (not as individual tiles) and transported to the remote apparatus where the dataset of control information is used to tell the client which unchanged areas are to be overlaid on the decompressed image.

It will be apparent from the above that, in the case of an unchanged area which is either completely surrounded by other unchanged areas or by a combination of other unchanged areas and edges of the image, then the area may be completely blanked out, without introducing any undesirable edge effects. This circumstance may be avoided by careful definition of areas.

In excess of 90% of each unchanged area can be safely blanked out, according to various embodiments of the invention. Advantageously, the blanked out areas will compress to practically zero and reduce the overall image size for storage and the bandwidth requirement for transmission without any noticeable image degradation.

Blanking is represented in the drawings and described above as a block of black but could be implemented according to further embodiments of the invention by means of any appropriate shading which results in a reduction in the size of the resulting compressed file.

The areas or by which an image is processed according to the invention are different from the conventional tiles used in JPEG2000, which may be compressed and sent independently of the whole of the image to which they belong. The areas of the present invention are both compressed and sent as part of an entire image, after having been processed, as set out above.

The above embodiments are to be understood as illustrative examples of the invention. Further embodiments of the invention are envisaged and will be evident to the skilled reader. It is to be understood that any feature described in relation to any one embodiment may be used alone, or in combination with other features described, and may also be used in combination with one or more features of another of the embodiments, or any combination of the embodiments. Furthermore, equivalents and modifications not described above may also be employed without departing from the scope of the invention, which is defined in the accompanying claims.

Reference in the above to "boundary" or "boundaries", should not be interpreted as limiting the areas to recognisable geometrical shapes as these areas may take irregular shapes with, for example, no distinguishably separate edges but a single perimeter. It will be appreciated that the invention is not limited to any particular form or topography of area and the term "boundary" should be understood to include reference to the entire perimeter of an area or a part of the perimeter, as required by the context.

As will be understood by those skilled in the art, the invention may be implemented in computer program product software, any or all of which may be contained on various storage media so that the program can be loaded onto one or more computers or could be downloaded over a computer network using a suitable transmission medium. The computer program product used to implement the invention may be embodied on any suitable carrier, readable by a suitable computer input device, such computer program product comprising, for example, optically readable marks or magnetic media.

The invention claimed is:

1. A method for processing graphical data representing a sequence of images for compression, including:
   analysing a plurality of adjacent areas of an image from the sequence to determine:
   (i) a first set of areas, each of which includes changes when compared with a corresponding area in a previous image from the sequence; and
   (ii) a second set of areas, each of which does not include a change when compared with a corresponding area in the previous image;
   for each area of the second set, replacing a section of the area with a block chosen to reduce the size of the graphical data once compressed, while leaving the original image adjacent any part of the perimeter of the area of the second set that adjoins an area of the first set;
   providing a dataset allowing identification of the areas of the second set; and
   compressing the second set of areas, processed as set out above, and the first set of areas, as a single image.

2. A method as claimed in claim 1 including, when a part of the perimeter of an area of the second set adjoins another area of the second set, extending the section replaced to the part of the perimeter that adjoins the other area of the second set.

3. A method as claimed in claim 1 including, when a part of the perimeter of an area of the second set adjoins an edge of the image, extending the section replaced to the part of the perimeter that adjoins the edge of the image.

4. A method for processing compressed graphical data representing a sequence of images, in which each image from the sequence comprises a plurality of adjacent areas; the plurality of areas including:
   (i) a first set of areas, each of which includes a change when compared with a corresponding area in a previous image from the sequence; and
   (ii) a second set of areas, each of which does not include a change when compared with a corresponding area in the previous image;
   the method including:
   decompressing compressed graphical data representing an image from the sequence;
   in which a section of each area of the second set has been replaced before compression with a block chosen to reduce the size of the compressed graphical data while leaving the original image adjacent any part of the perimeter of the area that adjoins an area of the first set;
   accessing a dataset allowing identification of the areas of the second set;
   processing the image by replacing each area of the second set with the corresponding area from a previous image.

5. A method as claimed in claim 4 in which the section replaced in an area of the second set extends to a part of the perimeter of the area in which the part of the perimeter adjoins another area of the second set.

6. A method as claimed in claim 4 in which the section replaced in an area of the second set extends to a part of the perimeter of the area in which the part of the perimeter coincides with an edge of the image.

7. A non-transitory computer-readable medium storing a computer program or a suite of computer programs, which upon being run on a processing system, perform the method defined in claim 1.

8. A system for processing graphical data representing a sequence of images for compression, comprising:
- an analyser for analysing a plurality of adjacent areas of an image from the sequence to determine:
  - (i) a first set of areas, each of which includes changes when compared with a corresponding area in a previous image from the sequence; and
  - (ii) a second set of areas, each of which does not include changes when compared with a corresponding area in the previous image;
- a processor configured to:
  - process the image by replacing a section of each area of the second set with a block chosen to reduce the size of the graphical data once compressed, while leaving the original image adjacent any part of the perimeter of the area that adjoins an area of the first set
  - provide a dataset allowing identification of the areas of the second set; and
  - compress the second set of areas, processed as set out above, and the first set of areas, as a single image.

9. A system as claimed in claim 8 in which, when part of the perimeter of a first area of the second set adjoins another area of the second set, the section replaced in the first area of the second set extends to the part of the perimeter that adjoins the other area of the second set.

10. A system as claimed in claim 8 in which, when a part of the perimeter of an area of the second set adjoins an edge of the image, the section replaced in the area of the second set extends to the part of the perimeter that adjoins the edge of the image.

* * * * *